Sept. 28, 1943.    M. E. HANSEN    2,330,351
METHOD OF MAKING RUBBER ARTICLES
Filed Oct. 1, 1942
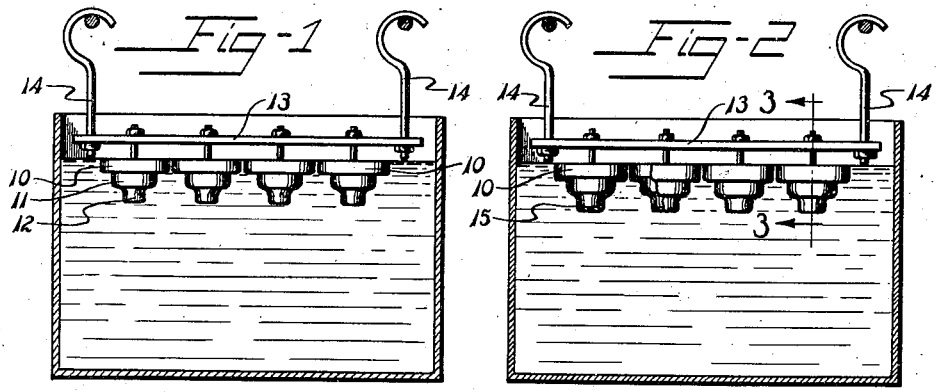
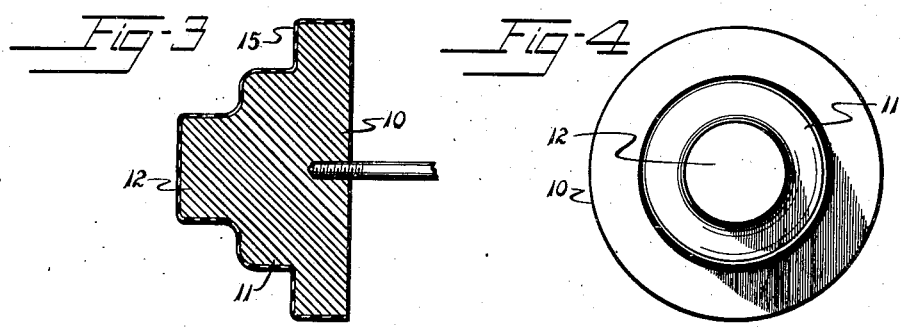
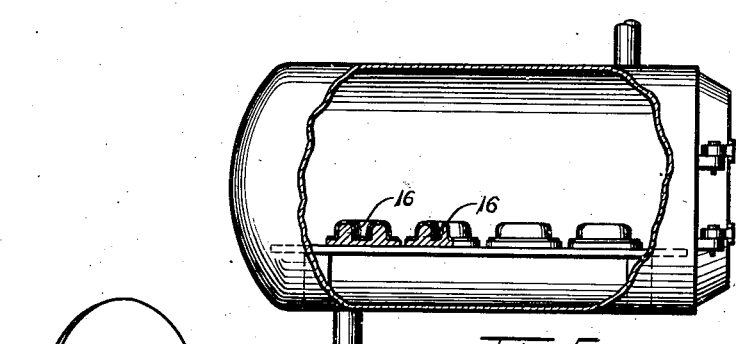
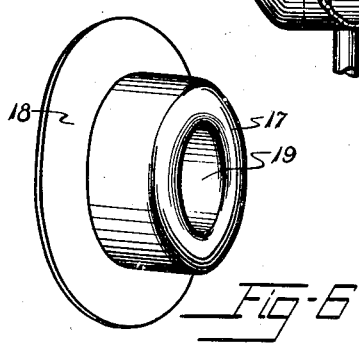
Inventor
Merrill E. Hansen
By Willis F. Avery
Atty.

Patented Sept. 28, 1943

2,330,351

UNITED STATES PATENT OFFICE 2,330,351

METHOD OF MAKING RUBBER ARTICLES

Merrill E. Hansen, Silver Lake Village, Ohio, assignor to American Anode Inc., Akron, Ohio, a corporation of Delaware Application October 1, 1942, Serial No. 460,333

5 Claims. (Cl. 18—58)

This invention relates to a method of making articles from an aqueous dispersion of a rubbery material, and particularly relates to a method of making rubber articles of complex shapes by immersing a deposition form in latex.

It is common practice in rubber manufacturing to make articles from an aqueous dispersion of a rubbery material, such as latex, by depositing rubber on a deposition form having the shape of the article that is to be produced. This is usually done by coating a form with a latex coagulant, immersing the coated form in latex, and then allowing sufficient time to build up a rubber deposit of the thickness that is desired. It is quite often found, however, that if the form has a complex shape, such as one with concave surface portions, that it is very difficult to get a smooth deposit of rubber over the form because of the presence of entrapped air, forming bubbles. This results in an uneven deposit where the rubber is quite thin and easily ruptured. It is therefore an object of this invention to provide a method of making rubber articles of complex shape from an aqueous dispersion of a rubbery material wherein this danger of air bubble formation is eliminated.

In practicing the method of my invention for making a rubber article having at least a portion of its surface of concave configuration, I provide a form wherein the surface corresponding to the concave portion of the article to be produced is of a convex configuration. This form is immersed in an aqueous dispersion of rubbery material, withdrawn, the deposit washed and at least partially dried, and then stripped off. Thereafter the portion of the deposit that is to be concave is forced into concave position and the rubbery material is set while maintaining the above portion in its concave position. After it is set this portion of the deposited rubbery material is thereafter of concave configuration.

This invention is particularly applicable for making rubber articles from latex wherein some portions of the article are of convex configuration while other portions of the article are of concave configuration. Here, there is provided a deposition form of some smooth, inert material such as glass, porcelain, stainless steel, or the like. This deposition form is so constructed that portion of its area corresponding to convex portions of the rubber article to be produced are convex, while portions of its area corresponding to concave portions of the rubber article are likewise convex. The deposition form is immersed in a latex coagulant and then into latex so as to give it an overall coating of latex rubber. The rubber deposit is washed, at least partially dried, and the deposit stripped from the deposition form. The convex portion of the rubber deposit which it is desired to have concave is then forced into concave position and the rubber is vulcanized. This vulcanization serves to set the rubber in its new shape and there is produced a latex rubber article having some portions of its surface of convex configuration while other portions of its surface are of concave configuration. In most instances it is desirable to provide an auxiliary form to serve as a support for the rubber deposit during vulcanization but this is not always necessary.

In a typical embodiment of this invention there is produced a circular rubber diaphragm having a circular convex portion concentric with the outside edge of the diaphragm and a concave portion in the center of the diaphragm. Such an embodiment is illustrated in the accompanying drawing, of which Fig. 1 is an elevation, partially in cross-section, of a number of deposition forms immersed in a latex coagulant;

Fig. 2 is an elevation, similar to Fig. 1, in which the forms are immersed in latex;

Fig. 3 is a vertical section taken along line 3—3 of Fig. 2;

Fig. 4 is a plan view of one of the forms shown in Figs. 1–3;

Fig. 5 is an elevation, partially broken away and sectioned, showing the rubber deposits mounted on auxiliary forms and undergoing vulcanization; and Fig. 6 is a perspective of a finished rubber diaphragm made according to the method of this invention.

In practicing a typical embodiment of this invention, illustrated in the drawing, for making a circular rubber diaphragm (Fig. 6) having a raised portion of convex configuration concentric with the outside edge of a diaphragm and a depressed portion of concave configuration in the center, there is provided a deposition form 10 of circular shape with a raised area portion 11 corresponding to the raised convex area portion of the diaphragm. The portion 12 of the form corresponding to the concave portion of the diaphragm, however, is also made convex and extending just as far above the other convex portion 11 of the form as the concave portion of the article extends below the convex portion of the article. This second convex portion of the form is of substantially the same shape as the concave portion of the rubber diaphragm to be produced.

Several of these deposition forms 10, 10 are mounted on a holder 13 to which is fastened hooks 14, 14 for easier handling. These forms are first immersed in a solution of any of the ordinary latex coagulants (Fig. 1), such as an alcohol solution of calcium nitrate, and then into a body of suitably compounded latex (Fig. 2). After the latex rubber 15 is deposited on the forms they are withdrawn from the latex, the rubber is washed, and at least partially dried. The rubber is then stripped from the deposition forms and mounted on auxiliary forms 16, 16 having the shape of the rubber diaphragm that is to be produced. These auxiliary forms are of the same size as the deposition forms and have convex portions corresponding to the concentric convex portion of the rubber diaphragm. However, where the center of the deposition form was convex these auxiliary forms are concave, like the finished diaphragm. The convex center portion of the rubber deposit is forced into concave position on the auxiliary form and the rubber is vulcanized as by heating in a steam vulcanizer (Fig. 5). After the rubber has been vulcanized the diaphragms are removed from the auxiliary forms. These diaphragms now have a circular shape with a convex portion 17 concentric with the outside edge 18 of the diaphragm and with a concave depressed portion 19 in the center of the convex portion. This concave portion 19 extends inwardly only as far as the plane defined by the edge portion 18 of the diaphragm.

It would be very difficult to make the diaphragm illustrated in Fig. 6 by providing a deposition form of this particular shape. The difficulty would lie in the ever-present danger of entrapping air in the concave portion of the form when it was immersed in latex. Although this invention has been described with reference to making rubber diaphragms, it is not limited to these articles but the method may be used for making any similar articles, even those of much more complex shape, and the methods used would be essentially the same.

The use of auxiliary forms for the rubber deposit during shaping and vulcanization is recommended but it is not always necessary. These forms support the rubber deposit and alleviate danger of its being distorted in handling.

When latex is used as the aqueous dispersion of a rubbery material for this invention, the deposited material is set by vulcanizing it, but with other materials this setting may be accomplished merely by drying, or by heating. For example, when an aqueous dispersion of neoprene is used the deposit may be set merely by heating it in air.

The aqueous dispersions of rubbery materials of this invention may be either natural or artificial dispersions of natural rubber or synthetic elastics. These include not only natural rubber latex and artificial dispersions of rubber but also dispersions of balata, polyisobutylene, butadiene polymers and copolymers, and the like. The use of these materials is well known by those skilled in the art.

Having described my invention with particular reference to making a particular article, namely, a rubber diaphragm, it is my intention that the invention be not limited to these details, however, but rather that it be construed broadly within the spirit and scope of the appended claims.

I claim:

1. In a method of making a rubber article from an aqueous dispersion of a rubbery material, said article having at least a portion of its surface of concave configuration, the method which comprises providing a deposition form having a corresponding surface portion of convex configuration, depositing rubbery material thereon from the aqueous dispersion of rubbery material, removing the rubbery deposit therefrom, forcing the portion of the rubbery deposit having a surface of convex configuration into a concave configuration, and setting the rubbery deposit while maintaining said concave configuration.

2. In a method of making a rubber article from latex, said article having a portion of its surface of concave configuration, the method which comprises providing a deposition form having a corresponding surface portion of convex configuration, depositing rubber thereon from the latex, removing the rubber deposit therefrom, forcing the portion of the rubber deposit having a surface of convex configuration into a concave configuration and vulcanizing the rubber deposit while maintaining said concave configuration.

3. In a method of making a rubber article from latex, said article having a portion of its surface of concave configuration, the method which comprises providing a deposition form having portions of its surface of convex configuration, depositing rubber thereon from latex, removing the rubber deposit therefrom, forcing at least a portion of the rubber deposit having a surface of convex configuration into a concave configuration, and vulcanizing the rubber deposit while maintaining said portion of said surface in said concave configuration.

4. In a method of making a rubber article from latex, said article having some surface portions of convex configuration and others of concave configuration, the method which comprises providing a form having corresponding surfaces all of convex configuration, depositing rubber thereon from latex, removing the deposited rubber from the deposition form, forcing the desired convex portions of the rubber deposit into concave configuration, and vulcanizing the rubber deposit while maintaining said concave configuration.

5. A method of making a complexly configured article of rubbery material, such as a diaphragm member having a raised portion of convex configuration and a centrally depressed portion of concave configuration, which comprises producing, by deposition of rubbery material from a liquid rubber composition, a cupped member of rubbery material having a plurality of convexly projecting portions, arranged one within the other, thereafter inverting one of the said convexly projecting portions to provide a concave portion within one of the other said convexly projecting portions, and setting the rubbery material while maintaining the latter configuration.

MERRILL E. HANSEN.